United States Patent [19]

Leary et al.

[11] Patent Number: 4,954,066
[45] Date of Patent: Sep. 4, 1990

[54] THERMOFORMING AND CONVEYOR CHAIN GUIDE APPARATUS

[75] Inventors: Lynn Leary; Ronald C. Schumann, both of Batavia, Ohio

[73] Assignee: Cincinnati Milacron Inc., Cincinnati, Ohio

[21] Appl. No.: 286,925

[22] Filed: Dec. 20, 1988

[51] Int. Cl.[5] .................... B29C 49/28; B65G 15/10
[52] U.S. Cl. .................... 425/388; 198/692; 198/838; 198/860.3
[58] Field of Search ............... 198/692, 838, 840, 841, 198/580; 271/18.3; 425/388, 397, 405.1, 387.1

[56] References Cited

U.S. PATENT DOCUMENTS

| | | | |
|---|---|---|---|
| 1,704,419 | 3/1929 | Ackley | 198/838 |
| 1,908,699 | 5/1933 | Ellis | 425/397 |
| 2,698,078 | 12/1954 | Harrison | 198/195 |
| 2,764,276 | 9/1956 | Ruppe | 198/860.3 |
| 2,943,728 | 7/1960 | Dommann | 198/860.3 |
| 3,367,718 | 2/1968 | Hauschopp | 198/860.3 |
| 3,496,257 | 2/1970 | Brown et al. | 425/397 |
| 3,664,791 | 5/1972 | Brown | 425/156 |
| 3,709,967 | 1/1973 | Held, Jr. | 264/89 |
| 3,791,567 | 2/1974 | Schott, Jr. | 226/112 |
| 3,837,782 | 9/1974 | Meissner et al. | 425/347 |
| 3,878,735 | 4/1975 | Preuss | 74/250 |
| 3,908,883 | 9/1975 | Bellisai et al. | 226/74 |
| 3,958,394 | 5/1976 | Mahaffy et al. | 53/511 |
| 3,977,587 | 8/1976 | Baldyga et al. | 226/74 |
| 4,027,577 | 6/1977 | Thompson et al. | 198/692 |
| 4,062,444 | 12/1977 | Nakov et al. | 198/838 |
| 4,099,902 | 7/1978 | Oberloier | 425/388 |
| 4,105,736 | 8/1978 | Padovani | 264/153 |
| 4,196,164 | 4/1980 | Ward | 264/322 |
| 4,396,112 | 8/1983 | Wietersheim et al. | 198/822 |
| 4,409,173 | 10/1983 | Padovani | 264/210.2 |
| 4,440,294 | 4/1984 | Langen | 198/838 |
| 4,475,881 | 10/1984 | Borst et al. | 425/397 |
| 4,545,477 | 10/1985 | Besch | 198/841 |
| 4,560,339 | 12/1985 | Padovani | 425/437 |
| 4,576,276 | 3/1986 | Boltrek et al. | 198/838 |
| 4,608,009 | 8/1986 | Whiteside et al. | 425/590 |
| 4,693,052 | 9/1987 | Rebmann et al. | 198/860.3 |
| 4,729,471 | 3/1988 | Tüns et al. | 198/860.3 |
| 4,740,342 | 4/1988 | Menard et al. | 264/549 |

Primary Examiner—Willard Hoag
Attorney, Agent, or Firm—Nies, Kurz, Bergert & Tamburro

[57] ABSTRACT

A chain guide structure for guiding a conveyor chain through a thermoforming machine to protect the chain from plastic chips and other debris. The chain guide includes a support rail structure for supporting an upper run of conveyor chain, and a spring steel cover sheet overlying a track defined by the support rail and in close proximity with the chain to serve as a cover and thereby protect the chain from contamination from foreign material. Additionally, the chain includes a series of spikes to penetrate a plastic sheet and thereby carry it through the machine, wherein the chain guide structure has a width sufficient to permit lateral outward expansion of the plastic sheet as it is heated in the thermoforming machine. An upwardly inclined portion of the guide structure provides a cooling section to permit the plastic sheet to cool as it is carried away from a forming section of the machine.

11 Claims, 2 Drawing Sheets

THERMOFORMING AND CONVEYOR CHAIN GUIDE APPARATUS

BACKGROUND OF THE INVENTION

1. Field of the invention

This invention relates to chain-type conveyors that are used for conveying sheet materials, and more particularly to a guide rail structure for guiding the movement of a conveyor chain along a predetermined path and to protect the chain from jamming as a result of an accumulation of chips of the material being conveyed and other particulate matter, as well as to guide the chain in a predetermined direction and with a minimum of frictional drag.

2. Description of the related art

Chain-type conveyors for conveying sheet materials, such as sheets of plastic, oftentimes traverse paths that subject the chain to chips of plastic or other particulate matter that can accumulate on the chain or on the chain guide rail. Such accumulations of material can cause stopping or slowing of the movement of the chain and thereby impede or interrupt the process to which the sheet is intended to be subjected.

For example, in thermoforming apparatus in which a sheet of thermoplastic material is carried through a heating device to raise the temperature of the plastic material, and thereby soften it so that it can be drawn by vacuum into a plurality of molds to form containers and other drawn parts, the sheet is generally carried by a pair of laterally spaced conveyor chains that are parallel to each other. The chains each carry a series of piercing spikes to pierce the sheet adjacent to its outer edges so that the sheet can be positively conveyed through the machine. Oftentimes the areas in which thermoforming machines are located include scrap grinding apparatus that grinds scrap plastic into small chips, some of which may fall onto the chain or be carried by the softened edges of the plastic sheet, and when such particles have accumulated on the chain or chain guide rail they can cause a jam and slow or stop the movement of the chain.

In addition to the possible jamming of such a conveyor chain by chips and other debris, chain conveyors in thermoforming machines carry sheets of plastic through heating devices that serve to raise the temperature of the sheets so that it can be vacuum drawn into a plural cavity mold to form containers and other similar parts. In the course of carrying the sheet through the heating device, the sheet expands in a transverse direction, as a result of thermal expansion, and oftentimes the chain guide rail structures are such that insufficient space is provided to permit such lateral expansion, thereby also contributing to jams caused by interference between the edges of the sheet being conveyed and the chain guide rail structure.

Another problem experienced in guide structures for conveyor chains is excessive frictional drag when the chain is carried on a track that includes a lower track on which the chain rollers ride, and an upper track that is positioned adjacent to the upwardly facing surfaces of the chain roller. In such an arrangement the inner surface of the links that connect the several chain rollers slide against the sides of the upper and lower tracks, thereby imposing frictional drag that requires additional power to drive the chain at the proper speed, and also causing excessive wear of the contacting parts that requires periodic removal and replacement of either entire chains or of individual chain links.

It is an object of the present invention to overcome the problems that have been pointed out above in connection with prior art conveyor chain guide structures.

It is another object of the present invention to provide an improved guide apparatus for guiding a conveyor chain and to protect the chain from chips and other foreign particulate matter.

It is still another object of the present invention to provide a guide apparatus for guiding a conveyor chain and in which adequate space is provided for lateral expansion of a sheet being conveyed without interference between the edges of the sheet and the chain guide structure.

SUMMARY OF THE INVENTION

Briefly stated, in accordance with one aspect of the present invention, guide apparatus is provided for guiding a conveyor chain adapted to carry a web of sheet material along a predetermined path. The apparatus includes a lower guide positioned below the chain and extending in the direction of the predetermined path for supporting and guiding the chain. Additionally, an upper guide is provided to substantially overlie the lower guide and is spaced therefrom to define therewith a chain-receiving passageway within which and along which the conveyor chain travels. The passageway extends in the direction of the predetermined path of movement for the chain. The upper guide defines an overlying cover that extends over the chain to prevent particles of foreign matter from falling onto the chain.

DESCRIPTION OF THE PREFERRED EMBODIMENTS

Figure 1:
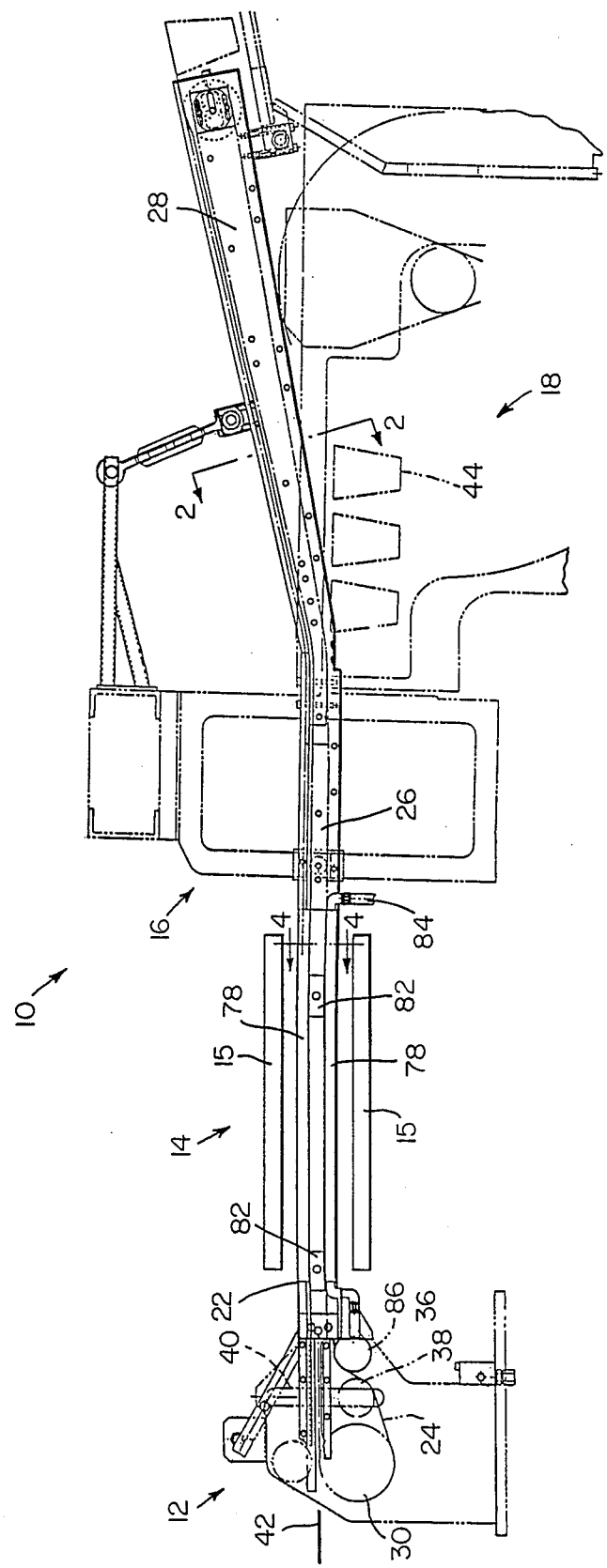
FIG. 1 is a side view of a portion of a thermoforming machine incorporating a chain guide rail in accordance with the present invention.

Referring now to the drawings, and particularly to FIG. 1 thereof, there is shown a portion of a thermoforming machine 10 that includes a sheet infeed section 12, a sheet heating section 14, a container forming section 16, a container removal section 18, and a sheet cooling section 20. Machine 10 includes a pair of laterally spaced, parallel guide rails for guiding a pair of conveyor chains. For ease of illustration, only one guide rail 22 and only one chain 24 are shown in FIG. 1. Guide rail 22 includes a substantially horizontal rail section 26 extending from sheet infeed section 12 to container forming section 16, and an upwardly inclined rail section 28 on the downstream side of container forming section 16 to define sheet cooling section 20.

Chain guide rails 26 and 28 support and guide endless chain 24 that passes around and is driven by a drive sprocket 30 that is rotatably carried in a chain drive support stand 32. Chain 24 travels from sheet infeed section 12 along guide rail section 26 in a direction toward sheet heating section 14 and through container forming section 16, whereupon it travels in an upwardly inclined path along guide rail section 28 to cooling station 20 and idler sprocket 34. After passing around idler sprocket 34 chain 24 returns along the lower portion of guide rail sections 28 and 26 to sheet infeed section 12, where it passes over idler sprocket 36 and then around tension control sprocket 38 to again engage drive sprocket 30. Tension control sprocket 38 is rotatably carried in a support (not shown) that is movable in direction substantially perpendicular to guide rail section 26 along a tension sprocket guide slot 40 to maintain a desired amount of tension in chain 24.

The sheet of plastic material 42 can be provided as a continuous web in roll form (not shown), as a series of individual sheets of predetermined length, or, alternatively, it can be provided directly by an extruder positioned on the upstream side of sheet infeed section 12. In that regard, an example of such an upstream extruder is shown and described in U.S. Pat. No. 4,409,173, which issued Oct. 11, 1983, to Pietro Padovani, the disclosure of which is hereby incorporated herein by reference as if it were fully set forth herein.

Briefly, sheet 42 is carried to sheet infeed section 12 wherein it is gripped by conveyor chain 24 at each lateral edge of the sheet, and in a manner to be hereinafter described, and the sheet then passes horizontally toward and through sheet heating section 14, in which its temperature is raised to a level such that the sheet remains substantially self supporting, but is sufficiently softened that it can be formed into desired shapes by means of a drawing process. The heating of the sheet can be effected by heat sources 15 disposed above and below the sheet, and the heat sources can be resistance heaters, infrared heaters, or the like.

After passing through sheet heating section 14, the sheet is carried by conveyor chain 24 to container forming section 16 to be formed into articles having a desired shape. Container forming section 16 can include a mold (not shown) in the form of a surface having a plurality of depressions or recesses having the desired shape, with vaccum means connected with the depressions to draw the softened sheet thereinto to provide the desired shaped articles when the sheet is cooled. An example of a mold structure for forming such drawn articles is shown and described in U.S. Pat. No. 4,105,736, which issued Aug. 8, 1978, to Pietro Padovani, the disclosure of which is hereby incorporated herein by reference to the same extend as if it were fully set forth herein.

After the sheet has been subjected to vacuum, which can, if desired, be accompanied by a pressing mandrel that is moved against the sheet and toward the recess in the mold to assist in the drawing of the article, the drawn articles, which are shown as containers 44 that can be, for example, cups, can be removed from the sheet at container removal section 18 by means of a suction-cup removal system (not shown), an example of which is disclosed in U.S. Pat. No. 4,560,339, which issued Dec. 24, 1985, to Pietro Padovani, the disclosure of which is hereby incorporated herein by reference to the same extend as if it were fully set forth herein.

After containers 44 have been removed from sheet 42 the sheet is carried by chain 24 along cooling section 20, which permits the sheet to cool sufficiently so that it can be handled and subsequently conveyed to a scrap grinder (not shown). During the time sheet 42 traverses cooling section 20 it is positively carried along inclined rail section 28 by chain 24 so that the sheet does not accumulate or buckle at the outlet of container forming section 16, but, instead, is positively conveyed away from container forming section 16 for subsequent treatment.

Figure 4:
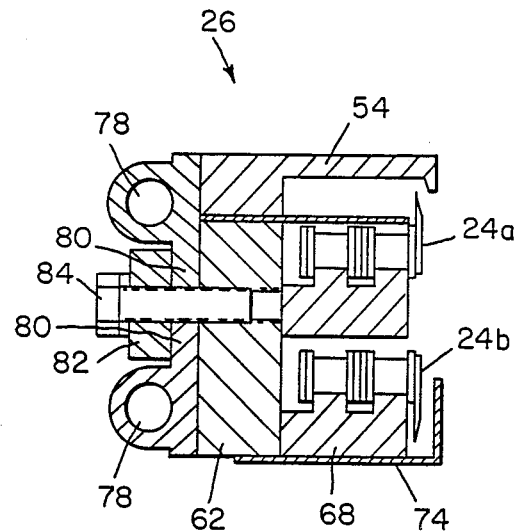
FIG. 4 is a cross-sectional view similar to that of FIG. 2, but taken along the line 4—4 of FIG. 1.
Figure 3:
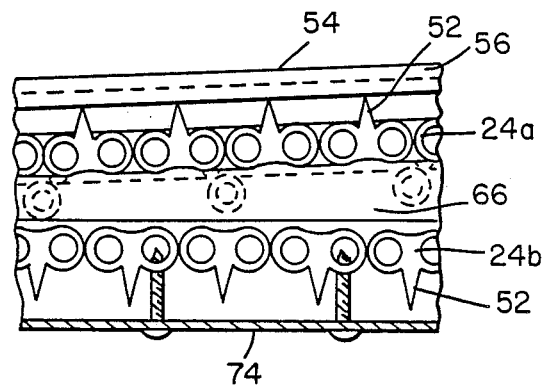
FIG. 3 is a fragmentary side view of the chain rail structure illustrated in FIG. 2, partially in section.
Figure 2:
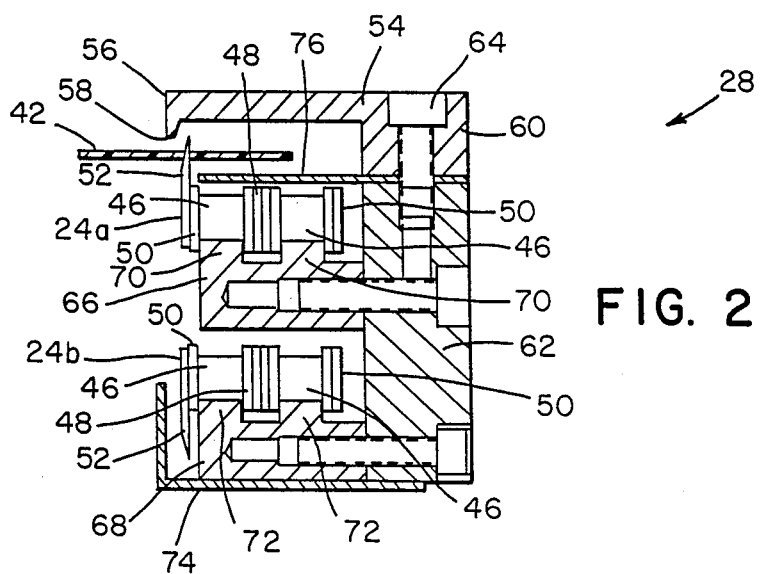
FIG. 2 is a cross-sectional view of the chain guide rail apparatus of FIG. 1 taken along the line 2—2 thereof.

Chain 24 and the associated chain guide rail sections 26 and 28 are shown more clearly in FIG. 2, 3, and 4. Referring now to FIG. 2, there is shown in cross section a portion of inclined chain guide rail section 28 that supports and carries an upper run of chain 24a as well as lower run 24b thereof. As shown, chain 24 is a double strand chain that incorporates a pair of spaced, co-axially positioned rollers 46 that are separated by a plurality of interior links 48, and at the outermost ends of rollers 46 are exterior links 50, the respective rollers and links being carried by and connected with a connecting pin (not shown), as is well known to those skilled in the art. The innermost edge of the chain, relative to the sheet that is being conveyed, includes a plurality of spaced, aligned spikes 52, the structure of which is more clearly shown in FIG. 3. A plurality of such spikes are carried in spaced relationship along one side of the chain, and as shown in FIG. 2, the spikes pierce and hold sheet 42 and thereby positively convey it through the machine.

Guide rail 28 includes a top cover member 54 that overlies and is spaced from chain 24a. Cover member 54 extends inwardly toward the longitudinal axis of sheet 42 beyond spike 52 to serve as a protective cover for the chain. Innermost end 56 of top cover member 54 includes a downwardly extending lip 58 that is positioned inwardly of spikes 52, relative to the sheet, to protect the chain, and also to partially cover the spikes. Top cover member 54 is connected at its outermost end 60 to an elongated, substantially rectangular main rail 62 by means of bolts 64, or the like. Also connected with main rail 62 are a pair of guide members, including an upper guide member 66 and a lower guide member 68, which extend inwardly from main rail 62 on the same side thereof and are vertically spaced from each other to permit lower run 24b of chain 24 to pass therebetween. Upper guide member 66 is spaced vertically below top cover member 54 to provide space for the passage of upper run 24a of chain 24, and also to permit the passage therebetween of sheet 42 that is conveyed by the chain.

Each of upper guide member 66 and lower guide member 68 includes a pair of parallel, substantially rectangular, upwardly extending rail, 70, 72, respectively, that each support respective chain rollers 46 for movement in the desired predetermined direction. Each of rails 70, 72, has a width that corresponds substantially with the axial lengths of the respective rollers, to lie between the respective links 48, 50 and thereby prevent excessive transverse movement of chain 24, relative to sheet 42, as the chain moves along the predetermined path. Additionally, lower guide member 68 carries an L-shaped guard member 74, which provides a cover for the downwardly extending chain spikes 52 on the lower chain run 24b.

Positioned between upper guide member 66 and top cover member 54 is a flexible, spring steel over sheet 76, which can have a thickness of from about 0.030 inches to about 0.080 inches, and preferably has a thickness of about 0.050 inches. Cover sheet 76 is carried by guide rail 28 and extends toward the longitudinal axis of sheet 42 in a direction parallel to the axes of chain rollers 46 to a point adjacent to the innermost of exterior links 50, but it terminates inwardly of spikes 52. Cover sheet 76 is in overlying relationship with the uppermost edges of the upper chain and is preferably spaced from the uppermost edges of the links by a distance of about 0.027 inches or so, to provide an upper retaining surface to prevent tilting of chain 24 about its longitudinal axis caused by lateral expansion of sheet 52, and at the same time of minimize the frictional drag that would otherwise be present if the uppermost edges of the links were in continuous contact with cover sheet 76. However, even if the uppermost edges of the links 48 and 50 are in direct contact with the sheet, any resulting frictional drag on the chain is considerably less than in prior art structures in which an upper rail similar in cross section to rails 70 extends downwardly toward the upwardly facing part of roller 46, which can cause excessive frictional drag between such an upper rail and the innermost faces of the respective links. Further, the positioning of cover sheet 76 above upper run 24a of the chain provides a protective cover for the chain, and thus any plastic chips or other debris or foreign material that might stick to and be carried by the soft plastic sheet along its outermost edges will not fall onto the chain and cause a jam, such as could occur in chain rail structures not incorporating such a cover sheet. Because cover sheet 76 is thin, it does not interfere with or contact plastic sheet 42, which is free to expand laterally outwardly.

Additionally, the positioning of cover sheet 76 above upper chain run 24a, but below the points of spikes 52 and below plastic sheet 42, provides an enlarged, unobstructed transversely extending area between spikes 52 and the innermost surface 55 of top cover member 54, to thereby permit considerable outward lateral expansion of the plastic sheet while it is being heated, without the sheet contacting the inner surface of top cover member 54, which would cause buckling of the plastic sheet and frictional drag between the plastic sheet and the main rail member.

Referring not to FIG. 4, the cross-sectional view thereshown illustrates the same basic guide rail structure and track structure as is illustrated in FIG. 2, but because the FIG. 4 cross section is taken near heating section 14, the guide rail structure incorporates coolant channels 78 to permit the passage therethrough of a coolant, such as cooling water, to avoid excessive expansion and heating of the chain as it passes through the heating station. As shown in FIG. 4, both upper and lower coolant channels 78 are provided, and they each include flanges 80. Channels 78 are retained in position against main rail 62 by means of a plurality of attaching blocks 82 that overlie flanges 80 and that are secured by connecting bolts 84. The cooling water entry and exit points are most clearly seen in FIG. 1, wherein only coolant inlet 84 and coolant outlet 86 for the lower coolant channel 78 is shown.

Also shown in FIG. 1 is the extension of rail section 26 in the form of inclined rail section 28, which positively carries the sheet away from the container removal section to permit the sheet to cool, and also to prevent sheet jams downstream of the forming section that have been experienced with prior devices in which such positive outward conveyance of the sheet was not performed.

As will be apparent to those skilled in the art, the chain rail guide structure herein disclosed provides substantial operating advantages over previously-known guide rail structures. Specifically, the structure of the present chain rail guide protects the upper run of the chain from jamming caused by chips and other foreign matter and debris that might attach to the tacky, softened plastic sheet as it travels through the machine, and it also serves to prevent pivoting of the chain as a consequence of lateral expansion or contraction of the plastic sheet caused by heating or cooling. Finally, because of the point contact between the steel sheet and the tops of the chain links, rather than the side surface contact in some of the prior art devices, the present invention imposes less frictional drag on the upper run of chain, thereby requiring less power to transport the chain and sheet through the machine.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A guided chain conveyor apparatus comprising:
  (a) a roller conveyor chain having means for carrying a web of sheet material along a predetermined path;
  (b) lower guide means positioned below the chain and extending in the direction of the predetermined path for supporting and guiding a run of chain;
  (c) cover means positioned above the lower guide means and spaced therefrom to permit free passage of the chain between the lower guide means and the cover means, the cover means extending over the chain as a protective cover to prevent debris from falling onto the chain; and
  (d) upper guide means for the run of chain positioned between the cover means and the chain and spaced from the lower guide means to define therewith a chain receiving passageway extending in the direction of the predetermined path, the upper guide means being a thin flexible member extending over the chain and sufficiently close thereto to provide an upper retaining surface to prevent tilting of the chain about an axis extending in the direction of the predetermined path.

2. Guide apparatus in accordance with claim 1, wherein the apparatus includes guide housing means for supporting the upper and lower guide means in opposed, spaced relationship to each other, and the guide housing means includes an unobstructed interior width that is greater than the width of the chain to permit lateral expansion of the sheet being conveyed.

3. Guide apparatus in accordance with claim 1, wherein the chain carries sheet gripping means.

4. Guide apparatus in accordance with claim 3, wherein the sheet gripping means includes a plurality of projections extending toward the sheet and carried by respective links, the projections being spaced from each other along the chain and adapted to penetrate the web of material that is conveyed.

5. Guide apparatus in accordance with claim 1, wherein the conveyor chain includes a plurality of rollers spaced from each other along the chain and parallel to each other, and the lower guide means includes a raised track for engaging and supporting the rollers.

6. Guide apparatus in accordance with claim 5, wherein the lower guide means includes a pair of spaced, parallel tracks to receive and support respective laterally spaced rollers of a double strand chain.

7. Guide apparatus in accordance with claim 1, wherein the overlying cover is a spring steel sheet.

8. Guide apparatus in accordance with claim 7, wherein the spring steel sheet has a thickness of about 0.050 inches.

9. In a thermoforming machine having a forming section and a conveyor chain for carrying a thermoplastic sheet into and out of the forming section, the improvement comprising a chain guide rail for guiding the conveyor chain while the chain conveys a sheet along a predetermined path within the machine, the guide rail including a lower guide track adapted to define a first conveyor chain track to receive and support a plurality of chain rollers of a link and roller-type chain, and an upper guide track overlying the lower guide track to define a second conveyor chain track to receive and support a plurality of chain rollers, a cover means for the track and a thin, flexible means between the cover and the chain, carried by the chain guide rail and extending over the second conveyor chain track sufficiently close to an upper surface of the chain to provide a flexible retaining surface and cover over a chain carried on the second conveyor chain track to prevent foreign matter from falling onto the chain and to provide an upper retaining surface to prevent the chain from tilting about an axis extending in the direction of the predetermined path.

10. A thermoforming machine in accordance with claim 9, wherein the cover means is a flexible, spring steel sheet having a thickness of from about 0.030 inches to about 0.080 inches.

11. In a thermoforming machine including sheet heating means for heating a thermoplastic sheet, and forming means for forming a plurality of shaped articles from a thermoplastic sheet, the machine having a conveyor chain for carrying a thermoplastic sheet into and through the sheet heating means and into and through the forming means, the improvement comprising a chain guide rail for guiding movement of a link and roller-type chain into and through the heating means and into and through the forming means, the chain guide rail including a lower chain support member including track cover means and a thin, flexible spring sheet between the cover and the chain sufficiently close to the upper surface of the chain to provide a protective cover over the upper run the of the chain, and to provide an upper retaining means to prevent the chain from tilting about an axis extending in the direction of movement of the chain, wherein the chain guide rial extends downstream of the forming means for a distance sufficient to permit cooling of a conveyed sheet it is carried downstream from the forming means.

* * * * *